Aug. 7, 1923.
L. H. OBERREICH
1,464,186
AUTOMOBILE LOCK AND THEFT NOTICE
Filed Nov. 22, 1920
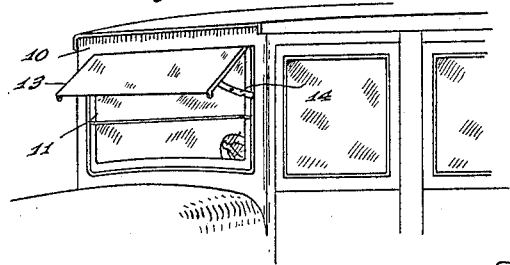
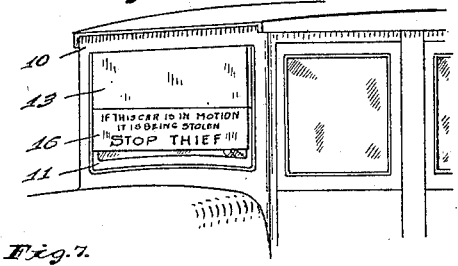
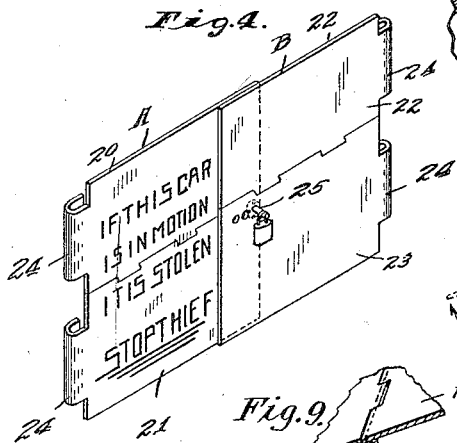
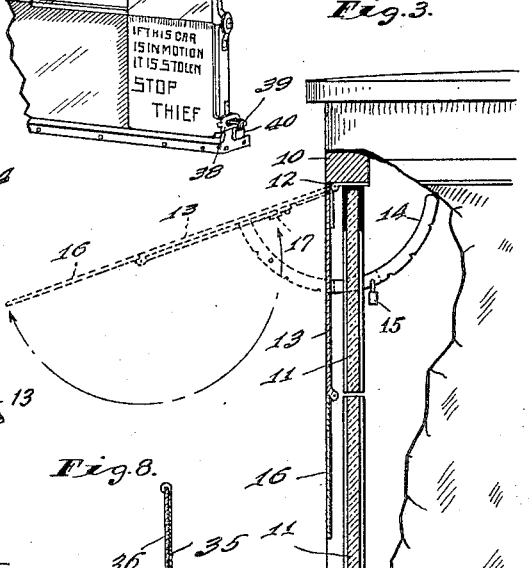
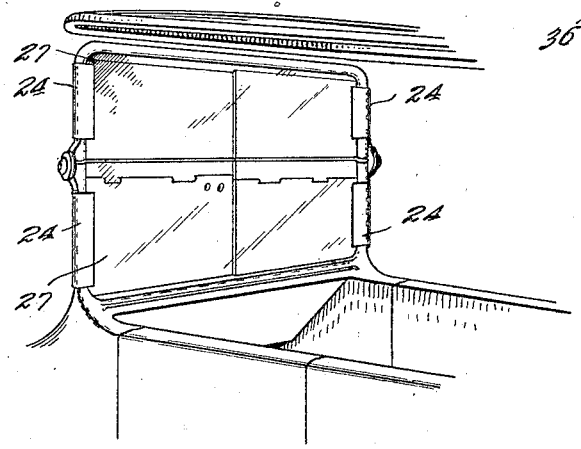
Inventor
Louie H. Oberreich,
By Hood Schley
Attorneys Patented Aug. 7, 1923.

1,464,186

UNITED STATES PATENT OFFICE.

LOUIE H. OBERREICH, OF INDIANAPOLIS, INDIANA.

AUTOMOBILE LOCK AND THEFT NOTICE.

Application filed November 22, 1920. Serial No. 425,625.

*To all whom it may concern:*

Be it known that I, LOUIE H. OBERREICH, a citizen of the United States, residing at Indianapolis, in the county of Marion and State of Indiana, have invented a new and useful Automobile Lock and Theft Notice, of which the following is a specification.

The object of my invention is to provide a convenient attachment for automobiles, which will serve as a readily recognizable signal, preferably in such form as to materially obstruct the driving vision of the driver, to indicate that the car, when in the hands of a thief and in motion, is in fact in the hands of a thief.

The accompanying drawings illustrate my invention. Fig. 1 is a perspective view of a car equipped with one form of my device and in condition for permissible driving; Fig. 2 a similar view, showing the parts in place to indicate theft if the car is in motion; Fig. 3 a fragmentary vertical section of the structure shown in Figs. 1 and 2; Fig 4 a perspective view of another form of my invention; Fig. 5 a perspective view of the structure shown in Fig. 4 in obstructing position; Fig. 6 a perspective view of another form applicable to a right-hand drive machine; Fig. 7 a perspective view of another form; and Fig. 8 a vertical sectional view of the construction shown in Fig. 7. Fig. 9 is a fragmentary sectional view showing the hinge connection.

In Figs. 1 to 3 of the drawings, 10 indicates the upper bar of the front opening in a closed body of an automobile, and 11 indicates the usual glass windshield. In such a car it is not uncommon to attach a glare shield or awning, generally opaque, at the upper edge of the opening, such shield being limited in its downward movement so that it cannot unduly obstruct the vision of the driver. In place of such an awning, I hinge, at 12, an opaque awning 13 provided with an adjusting segment 14 by which it may be held in the usual driving position, as indicated by dotted lines in Fig. 3, or may be locked in vision obstructing position, by a suitable locking means 15, as indicated in full lines in said Fig. 3. The awning 13 is provided, at its outer edge, with a hinged extension 16 which may be normally held in folded place by a holder 17, or may be extended to cover the lower part of the opening filled by the windshield.

One or the other of the awning segments, as shown, may carry a theft warning.

In Fig. 4 I show a collapsible structure, comprising two mating two-part sections A and B, comprising two plates 20 and 21, and 22 and 23, respectively, and provided with end hooks 24 which may be hooked over the sides of the windshield.

Plate 21 carries a lock-receiving pin 25 which may be projected through a proper hole in plate 23 as the parts are adjusted in vision-obstructing position over an ordinary windshield 27.

In Fig. 6, the two hinged plates 29 and 30 are similar to plates 22 and 23, while the lock-pin carrier 31 is provided at its outer end with hooks 32. In this form, the plates 29 and 30 will be positioned in vision obstructing position on an ordinary windshield.

In Figs. 7 and 8, I show a thin plate 35 which may be slipped up between the sections 36 and 37 of some forms of windshields, lying in front of the lower section and back of the upper section. Hinged to the lower outer corner of plate 35 is a hasp 38 which may be slipped over and locked upon pin 39 by lock 40. Pin 39 may conveniently be a screw substituted for one of the frame screws of the windshield and provided with an elongated non-circular head, laterally perforated to receive the lock 40.

It will be readily understood that the above-described theft preventive does not in any way interfere with the actual mechanism of the car and that, with proper tools, the device might be removed from the car. Such removal would take time, however, and the time element is a strong deterrent against theft.

On the other hand, any attempt to drive the car with the device in place makes the car so conspicuous as to force attention. The driver is also conspicuous because of the strained position which must be occupied in order to see to drive. Manifestly, with the device placed so as to cover the windshield, it is impractical to throw anything over the theft sign as such a cover would only render the car and its driver more conspicuous.

I claim as my invention:

1. A theft guard for automobiles comprising a vision-obstructing plate consisting of hinged members formed for interlocking engagement with a windshield in driving-vision obstructing position, and a cooperating member and lock to lock said plate in driving-vision obstructing position.

2. A theft guard for automobiles comprising a vision-obstructing plate formed for interlocking engagement with a windshield in driving-vision obstructing position, and a cooperating member and lock to lock said plate in driving-vision obstructing position.

3. A theft guard for automobiles comprising a vision-obstructing plate consisting of hinged members formed for interlocking engagement with a windshield, and a cooperating member and lock to lock said plate in position.

4. A theft guard for automobiles comprising a vision-obstructing plate formed for interlocking engagement with a windshield, and a cooperating member and lock to lock said plate in position.

In witness whereof, I have hereunto set my hand at Indianapolis, Indiana, this twentieth day of November, A. D., one thousand nine hundred and twenty.

LOUIE H. OBERREICH.